J. R. THOMAS.
HOLLOW CHISEL MORTISING MACHINE.
APPLICATION FILED NOV. 1, 1909.
965,962.
Patented Aug. 2, 1910.
4 SHEETS—SHEET 1.
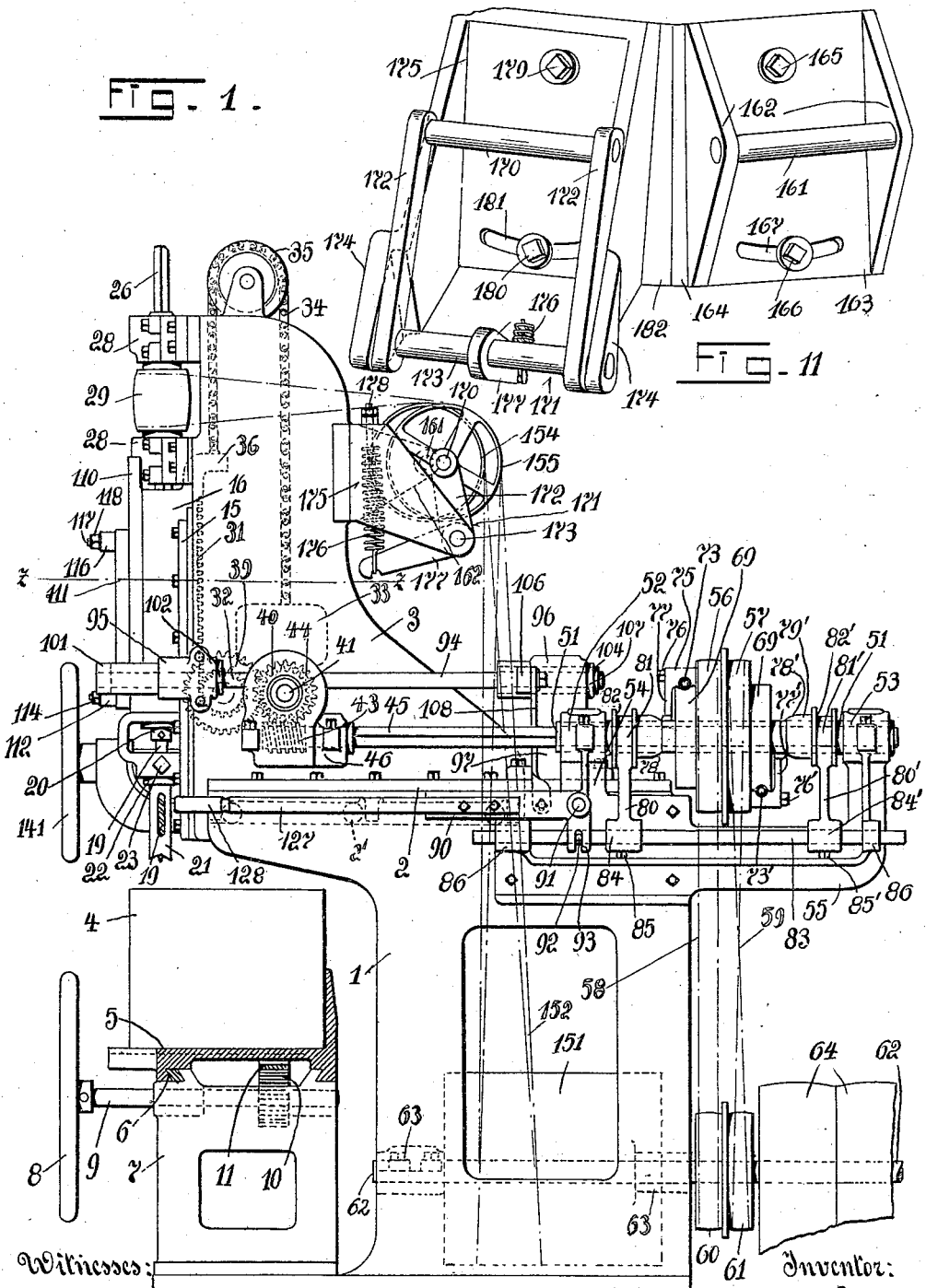

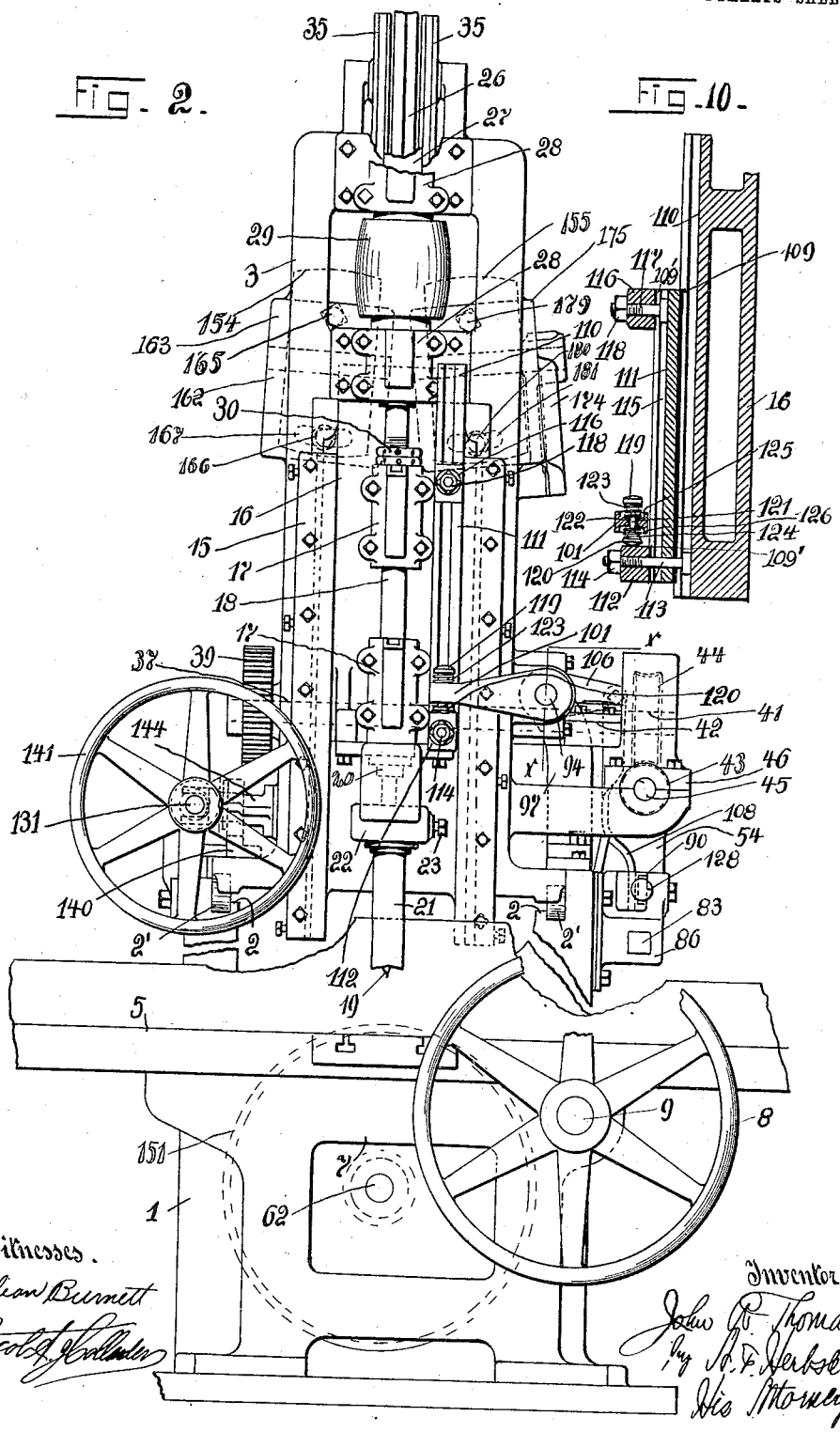

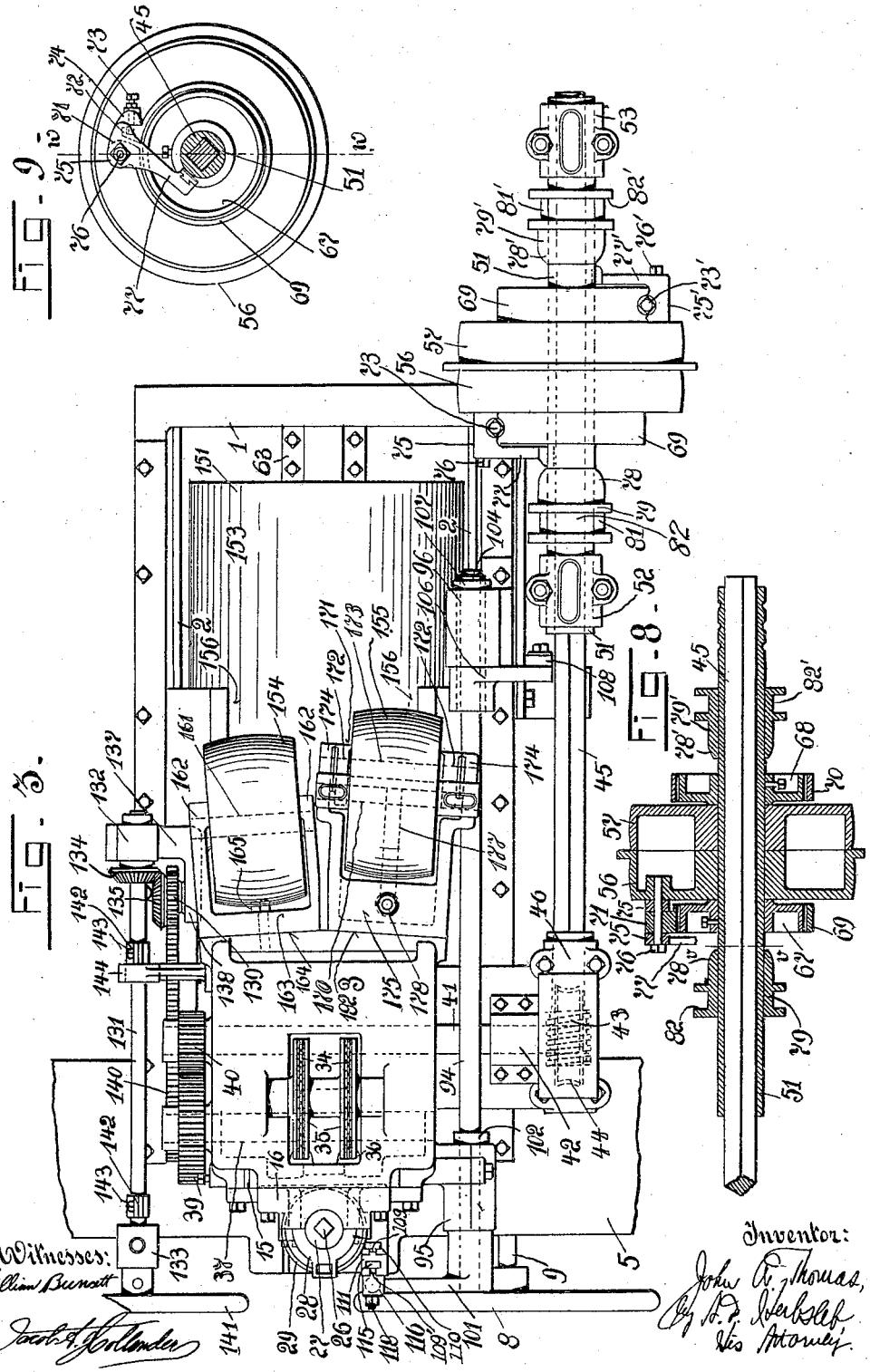

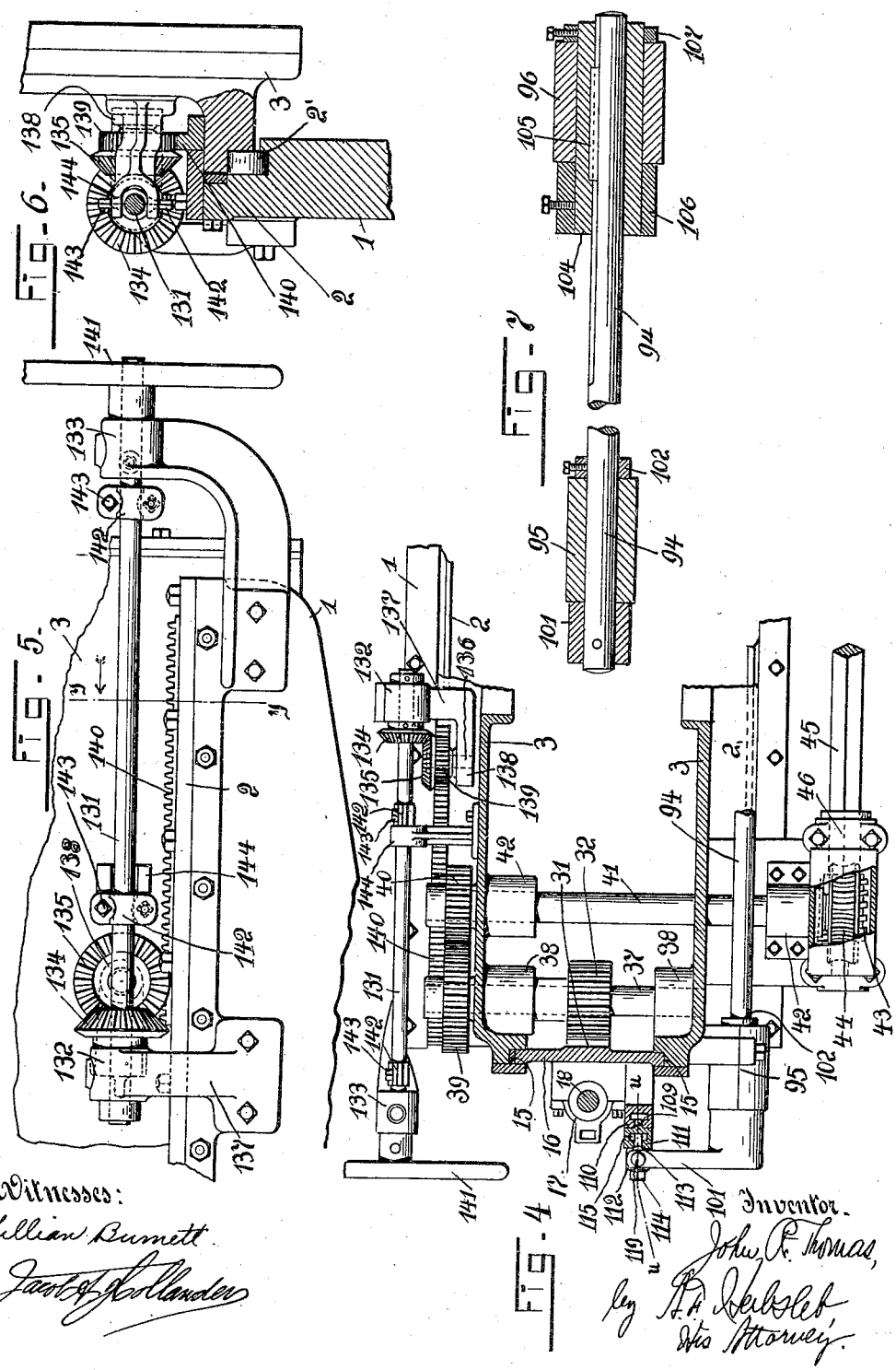

UNITED STATES PATENT OFFICE.

JOHN R. THOMAS, OF CINCINNATI, OHIO, ASSIGNOR TO J. A. FAY & EGAN COMPANY, OF CINCINNATI, OHIO, A CORPORATION OF WEST VIRGINIA.

HOLLOW-CHISEL MORTISING-MACHINE.

965,962.      Specification of Letters Patent.      Patented Aug. 2, 1910.

Application filed November 1, 1909. Serial No. 525,708.

*To all whom it may concern:*

Be it known that I, JOHN R. THOMAS, a citizen of the United States, residing at Cincinnati, in the county of Hamilton and State of Ohio, have invented certain new and useful Improvements in Hollow-Chisel Mortising-Machines, of which the following is a specification.

My invention relates to hollow chisel mortising machines, and consists in providing new and improved means for adjusting the length of reciprocation imparted to the ram which carries the rotating auger and hollow chisel and for adjusting the position at which said reciprocation shall take place; further in providing new and improved means for maintaining the driving connection for the auger which is within the hollow chisel irrespective of the positions to which the housing which carries the auger and hollow chisel may be adjusted; further in providing new and improved means for adjusting the auger and chisel ram and housing with the driving mechanism for the auger back and forth for moving the auger and chisel across the stock being operated on; and further in the parts, and in the construction, arrangement and combinations of the parts hereinafter more fully described and claimed.

In the drawings: Figure 1 is a side elevation of my improved device. Fig. 2 is a front elevation of the same partly broken away. Fig. 3 is a plan view of the same partly broken away. Fig. 4 is a horizontal section on the line $z$—$z$ of Fig. 1. Fig. 5 is a side elevation of the means for adjusting the housing upon the base. Fig. 6 is a vertical section of the same on the line $y$—$y$ of Fig. 5. Fig. 7 is a section of the ram-controlling mechanism taken on the line $x$—$x$ of Fig. 2. Fig. 8 is an axial section of the friction-clutches of the ram-driving mechanism, taken on the line $w$—$w$ of Fig. 9. Fig. 9 is a cross-section of the same on the line $v$—$v$ of Fig. 8. Fig. 10 is a detail of the ram-controlling mechanism on the line $u$—$u$ of Fig. 4; and, Fig. 11 is a rear elevation of the supports on which the directing pulleys for the belt of the vertical spindle are mounted, the pulleys being omitted.

In its preferred construction the frame of my improved device comprises a base 1 which has guideways 2 thereon in which a housing 3 is adjustable back and forth as on rollers 2' across the stock, represented as a timber 4, mounted on a table 5. The table may be of any desirable construction and be driven manually or by power means as may be desired. I have shown the same as slidable laterally on guideways 6 of a table-support 7, the movement of the table being accomplished by a hand-wheel 8 on a shaft 9 having a pinion 10 thereon which meshes with a rack 11 on the bottom of the table.

The housing has guideways 15 thereon in which a ram 16 has movement up and down, the ram being provided with bearings 17 in which a mandrel 18 turns. The mandrel has a boring-bit 19 secured at its lower end in a socket-head 20, the boring-bit being received in a so-called square or hollow chisel 21 which is secured stationarily with relation to the ram in a socket-head 22 by a bolt 23. The mandrel has an extension 26 thereon which is slidable longitudinally in a sleeve 27, being arranged to rotate with the sleeve. I accomplish this latter preferably by making the extension polygonal in cross-section, the bore of the sleeve being similarly formed. The sleeve is journaled in bearings 28 on the column and has a rotating means shown as a pulley 29.

The mandrel is caused to rotate, thereby rotating the auger within the hollow chisel, and the ram is caused to reciprocate, thereby causing simultaneous longitudinal reciprocating of the auger and hollow chisel for cutting the stock in the desired manner, for instance cutting holes, slots, rabbets, and the like. For causing the mandrel to move longitudinally with the slide, the same is held against endwise movement in the bearings 17, as by positioning the bearings 17 between the socket-head 20 and positioning-nuts 30.

I have found it desirable for rapid operation of the machine to limit the length of the reciprocating stroke of the auger and chisel so that the length of the reciprocation shall equal only the depth of the operation being performed on the stock plus such distance as it may be necessary to raise the auger and chisel above the stock in order to clear the stock in shifting the stock under the chisel and auger between downward movements of the latter. I have found it an advantage for accomplishing this to provide convenient means, operable preferably from their lower end, whereby the position at which the stroke takes place may be accurately determined without re-adjustment for length of stroke, so that, for instance, timbers of different cross-sectional sizes may be provided with similar depths of cut without re-adjustment for length of reciprocation. The construction has the further advantage that idle movements of the auger and chisel may be avoided, that is to say, unnecessary travel toward and from the timber outside the timber may be dispensed with.

I have shown a preferred form for causing travel of the auger and chisel ram, although it is within the spirit of my invention that other power driving means for the same may be provided. I have shown the auger and chisel ram as provided with a rack 31 with which a pinion 32 meshes.

33 is a counterweight for the ram and parts mounted thereon and has flexible connections 34 secured thereto which pass over sheaves 35 on the housing and connect with lugs 36 on the ram. The pinion 32 is on a shaft 37 mounted in bearings 38 on the column, the shaft having a gear 39 thereon. The gear 39 is meshed by a gear 40 on a shaft 41 journaled in bearings 42 in the column and having a worm-wheel 44 thereon, the worm-wheel being meshed by a worm 43 on a shaft 45, held against longitudinal movement and journaled in a bearing 46 on the column.

51 is a sleeve jornaled in bearings 52 53 respectively on an upright 54 and a bracket 55 of the base. The shaft is slidable longitudinally in the sleeve but is caused to rotate therewith, as by constructing the shaft polygonal in cross-section and providing the bore of the sleeve with similar form.

56 57 are pulleys loosely rotating about the sleeve and operated by belts 58 59 from pulleys 60 61 on a drive-shaft 62 which is journaled in bearings 63 on the base and rotated by suitable means, as by a belt passing over pulleys 64. One of the belts 58 59 is a cross-belt and the other a straight belt for rotating the pulleys 56 57 in opposite directions.

67 68 are friction-hubs suitably secured to the sleeve 51.

69 70 are friction-bands received about the friction-hubs and rotate with the respective pulleys 56 57. For causing driving connection between the friction-band 69 and the friction-hub 67, one end of the friction-band has a bearing 71. The other end of the friction-band has a nose 72 arranged to be contacted by a bolt 73 adjustable on a lever 74. The lever has pivot bearings 75. A stud-bolt 76 is received in the bearings 71 and 75 and is secured in the pulley 56. The tail 77 of this lever is arranged to be contacted by the sloping end 78 of a collar 79 on said sleeve, the collar being moved endwise by an arm 80 having a fork 81 received in an annular groove 82 of said collar, the arm being adjustably secured to a bar 83 as by being provided with a bearing 84 received about said bar and secured thereto by a set-bolt 85. When the collar 79 is moved endwise toward the friction-hub 67 the tail 77 will ride upon the sloping end 78 of the collar for drawing the friction-band 69 closely about the friction-hub 67 and thereby causing the said friction-hub to rotate with the pulley 56 and consequently rotating the shaft 45 in one direction.

For rotating the shaft 45 in the opposite direction, similar driving connection is provided between it and the pulley 57, the parts being indicated by similar but primed reference numerals.

When neither of the friction-bands is operatively connected with the friction-hubs, the auger and chisel ram is at rest or in normal position. The respective bands are caused to have operative engagement with the friction-hubs by the endwise shifting of the bar 83, the said bar being slidable in bearings 86 on the base.

90 is a bell-crank lever pivoted on a pin 91 on the base. It is articulated with the bar 83 as by providing the bar with a pin 92 received in a slot 93 in the bell-crank lever.

94 is a rock-shaft rockable in a bearing 95 on the housing and in a bearing 96 on an upright 97 extending from the base, the rock-shaft being permitted to slide longitudinally in one of said bearings without affecting its rocking action. I have shown the rock-shaft held against longitudinal movement in the bearing 95 by a rocker-arm 101 and a collar 102 secured to said rock-shaft at the respective sides of said bearing. In the bearing 96 there is a sleeve 104 with which the rock-shaft has spline-connection 105, the sleeve having an arm 106 thereon and being held against longitudinal movement in the bearing 96 by a collar 107. A link 108 is articulated with the arm 106 and with the bell-crank lever 90. When the housing is moved back and forth the rock-shaft slides in the sleeve.

110 is a guideway on the auger and chisel ram shown as an undercut slot.

111 is a stroke-positioning bar for adjusting the position of stroke of the auger and chisel ram, and has a rib 109 lengthwise of its rear face received in the guideway 110 for causing parallel movement of the bar with the guideway. This stroke-positioning bar is adjustable lengthwise of the guideway 110 from its lower end as by manipulating a tappet 112 preferably stationarily positioned thereon. Thus a T-bolt 113 has its head received in the slot 110, the shank of the bolt extending through the bar and tappet 112, the bar and tappet being clamped in adjusted positions lengthwise of the guideway by the clamp-nut 114. The stroke-positioning bar 111 is provided with a guideway 115 lengthwise of which a tappet 116 is adjustable toward and from the tappet 112 for adjusting the length of stroke of reciprocation of the auger and chisel ram. The tappet 116 is arranged to be secured in adjusted positions lengthwise of the guideway 115 by having a T-bolt 117 received in said guideway 115, shown as an undercut slot, the shank of the bolt passing through said tappet, the tappet being clamped in place by a clamp-nut 118, the length of the reciprocation of the auger and chisel ram being determined by the distance between the tappets on the stroke-positioning bar. The tappets have ribs 109' thereon received in the guideway 115. The position of the stroke is adjusted to different points lengthwise of the guideway 110 by adjustment of the stroke-positioning bar lengthwise of the said guideway without disturbing the adjustment for length of stroke. The tappets act on the arm 101, the rock-shaft, the arm 106, the link 108, the bell-crank lever 90, the bar 83, and the friction-clutches for reversing the movements of the latter and consequently of the shaft 45 for moving the auger and chisel ram up and down.

In order to avoid the shock due to change of direction of movement of the ram I provide cushioning means between the rocker-arm 101 and the tappets 112 116 preferably by providing bumpers 119 120 connected by a stem 121 received loosely through an aperture 122 in said rocker-arm, springs 123 124 being received in sockets 125 126 of said arm between said arm and said bumpers, the bumpers being struck by the said tappets.

For manually operating the friction-clutches I provide the bell-crank lever with an arm 127 having a handle 128 thereon, by means of which the parts may be brought into neutral position, or initially started or stopped.

Convenient means are also provided for adjusting the auger and chisel ram and housing back and forth across the stock by means which are conveniently positioned and exert great power upon the parts for permitting easy movement of the same. These means embrace a shaft 131 which extends parallel with the guideways 2 and is mounted in bearings 132 133 on the base. The shaft has a bevel-pinion 134 thereon which meshes a bevel-pinion 135 on a stud-shaft 136 whose rotary axis extends at right angles to the rotary axis of the shaft 131.

137 is a bracket on which the bearing 132 is located and which also has a bearing 138 at right angles to the bearing 132 for the stud-shaft 136, the bracket being secured to the base. The stud-shaft also has a pinion 139 thereon which rotates with the bevel-pinion 135 and meshes with a rack 140 secured to the housing.

141 is a hand-wheel secured to the front end of the shaft 131, the hand-wheel being located at the front of the machine within convenient reach of the operator. The shaft 131 has blocks 142 adjustably secured lengthwise thereof, the blocks being shown as half-blocks clamped about the shaft by clamp-bolts 143. The blocks are arranged to be engaged by a lug 144 on the housing. The positioning of the blocks determines the limit of cross-movement of the housing and consequently the limit of positions across the stock to which the auger and chisel may be moved.

For driving the auger, I provide a drum 151 on the drive-shaft, a belt indicated at 152 passing over said drum and being directed through an opening 153 in the base and a recess 156 in the rear of the housing and passing over directing-pulleys 154 155 and about the pulley 29. The pulley 154 is journaled on a shaft 161 mounted in brackets 162 of a bearing-piece 163, the bearing-piece being pivoted against the face 164 as on a bolt 165, for permitting adjustment of the axial plane of the pulley 154. For holding the bearing-piece in adjusted position I provide a clamp-bolt 166 received into the column through a slot 167 in the bearing-piece.

The pulley 155 is mounted on a shaft 170 mounted on a lever 171 movable for shifting the position of said pulley in order to tighten the belt running thereover. This lever is shown as a bell-crank lever having the shaft 170 mounted in arms 172 thereof and pivoted on a shaft 173 in brackets 174 on a bearing-piece 175, a spring 176 being connected with the arm 177 of said lever at one end thereof and to the bearing-piece 175 at its other end. The tension of the spring may be adjusted by nuts 178. The bearing-piece 175 is pivoted on a bolt 179 and secured in adjusted positions by a bolt 180 passing through an arc-slot 181 in said bearing-piece into the housing, the bearing-piece being adjustable on the bearing-face 182 of the column for adjusting the axial plane of the pulley 155.

The bearing-faces 164 182 extend at obtuse angles with relation to each other for maintaining the vertical centers of said pulleys on the bearing-pieces in true relation with the lateral faces of the driving drum 151 and pulley 29, so that the belt will not slip off the pulleys. Provision is also made for shifting the angles of the rotary axes of said pulleys 154 155 for giving proper lead to the belt. Automatic tightening means for said belt are also provided. By my improved device danger of lateral slippage of the belt is avoided throughout the reciprocating movements of the auger and chisel ram and housing during operation of the machine.

Having thus fully described my invention, what I claim as new and desire to secure by Letters Patent is:

1. In a hollow chisel mortising machine, the combination of a frame, an auger and chisel ram, driving means for reciprocating said ram up and down on said frame, a tappet-bar extending up and down and adjustable from its lower end for adjusting the position of reciprocation of said ram, and tappets on said tappet-bar relatively adjustable for distance between them for adjusting the length of reciprocation of said ram.

2. In a hollow chisel mortising machine, the combination of a frame, an auger and chisel ram thereon, said frame and ram constituting a pair of parts having relative movement between them, means for reciprocating said ram, and means for initiating said reciprocation located between said frame and ram comprising a guidebar on one of said parts, a tappet bar, a pair of tappets thereon, means for adjusting said tappet-bar from its lower end lengthwise of said guidebar for determining the position of reciprocation of said ram, means for adjusting the distance between said tappets on said tappet-bar for adjusting the length of reciprocation of said ram, and an engaging part for said tappets on the other of said parts.

3. In a hollow chisel mortising machine, the combination of a frame, an auger and chisel ram thereon, said frame and ram constituting a pair of parts having relative movement between them, means for reciprocating said ram, and means for initiating said reciprocation located between said frame and ram comprising a guidebar on one of said parts, a tappet-bar, a pair of tappets thereon, means for adjusting said tappet-bar lengthwise of said guidebar for determining the position of reciprocation of said ram, means for adjusting the distance between said tappets on said tappet-bar for adjusting the length of reciprocation of said ram, an engaging part for said tappets on the other of said parts, and cushioning means between said engaging part and tappets comprising cushioned bumpers at the respective sides of said engaging part.

4. In a hollow chisel mortising machine, the combination of a frame, an auger and chisel ram reciprocating thereon, a tappet-bar, tappets thereon, said ram and tappet-bar having undercut slots lengthwise thereof, a bolt received through one of said tappets and said tappet-bar into the undercut slot of said ram for clamping said tappet-bar and the tappets thereon lengthwise of said undercut slot of said ram, and a bolt received through the other of said tappets into the undercut slot of said tappet bar for clamping said other of said tappets in adjusted positions lengthwise of both said slots, substantially as described.

5. In a hollow chisel mortising machine, the combination of a frame, an auger and chisel ram reciprocating thereon, reversible driving means for causing said reciprocation, said ram having a guideway lengthwise thereof, a tappet-bar, tappets thereon, a rock-shaft having connection with said driving means for reversing the same, an arm on said rock-shaft arranged to be engaged by said tappets for initiating the reversals in said driving means, means at the lower end of said tappet-bar for clamping the same with the tappets thereon lengthwise of said guideway for adjusting the position of engagement thereof with said arm, and means for adjusting the distance between said tappets for adjusting the length of movements of said ram between engagements of said tappets with said arm, substantially as described.

6. In a hollow chisel mortising machine, the combination of a frame, an auger and chisel ram reciprocating thereon, driving means for causing said reciprocation, said ram having a guideway lengthwise thereof, a tappet-bar adjustable lengthwise of said guideway, a plurality of tappets on said tappet-bar, means for adjusting the distance between said tappets on said tappet-bar, an arm having connection with said driving means for reversing the same, and a bumper-rod slidable on said arm and having cushioned bumpers at its respective ends arranged to be engaged by said tappets, substantially as described.

7. In a machine of the character described, the combination of a base, a housing adjustable back and forth thereon, a ram reciprocating up and down on said housing, an auger spindle journaled on said ram, the said spindle reciprocating with said ram, a pulley received about said spindle, a drum in said base having a rotary axis which is parallel to the direction of adjustment of said housing on said base, a pair of pulleys mounted on and movable with said housing and arranged for directing a belt passing between said drum and first-named pulley, said pair of pulleys having rotary axes which extend in vertical planes which intersect each other, means for adjusting the rotary axes of said pulleys in said vertical planes, and means for permitting yield of one of said pulleys against pressure, substantially as described.

8. In a machine of the character described, the combination of a base, a housing adjustable back and forth thereon, a ram reciprocating up and down on said housing, a hollow-chisel socket-head and an auger spindle in line with each other on said ram and reciprocating endwise therewith, a sleeve journaled on said housing, said spindle having an extension slidable in and rotating with said sleeve, a pulley on said sleeve, a drum in said frame having a rotary axis which is parallel to the direction of adjustment of said housing, pulley-brackets arranged to be adjusted on said housing in intersecting vertical planes, pulleys mounted on said brackets whose rotary axes are in vertical planes parallel to the vertical planes in which said brackets are respectively adjustable, and pressure means for one of said pulleys, substantially as described.

9. In a hollow chisel mortising machine, the combination of a base, a housing, said base having a horizontal guideway in which said housing is movable back and forth, an auger and chisel ram reciprocating up and down on said housing, and means for adjusting said housing on said base in said guideway comprising a shaft and a rack extending lengthwise of said guideway, a pinion meshing with said rack having a rotary axis transverse to the rotary axis of said shaft, gearing between said shaft and pinion for rotating said pinion from said shaft, and stops adjustable on said shaft, substantially as described.

10. In a machine of the character described, the combination of a base having a guideway thereon, a housing adjustable in said guideway, said base and housing constituting two parts having relative adjustment between them, and means for causing said adjustment comprising the following instrumentalities mounted on one of said parts, namely: a shaft extending lengthwise of said guideway, a bearing-bracket having a bearing for said shaft and a bearing transverse thereof, a stud in said last-named bearing, a pinion on said stud, gearing between said shaft and pinion, and a rack for said pinion on the other of said parts, substantially as described.

11. In a machine of the character described, the combination of a base having a guideway thereon, a housing adjustable in said guideway, said base and housing constituting two parts having relative adjustment between them, and means for causing said adjustment comprising the following instrumentalities mounted on one of said parts, namely: a shaft extending lengthwise of said guideway, a bearing-bracket having a bearing for said shaft and a bearing transverse thereof, a stud in said last-named bearing, a pinion on said stud, gearing between said shaft and pinion, a rack for said pinion on the other of said parts, and adjustable stops between said shaft and the said other of said parts, substantially as described.

In testimony whereof, I have signed my name hereto in the presence of two subscribing witnesses.

JOHN R. THOMAS.

Witnesses:
   HARPER G. ROSS,
   RICHARD D. COAN.